United States Patent [19]

Thuli

[11] Patent Number: 5,195,426
[45] Date of Patent: Mar. 23, 1993

[54] CHEESE BRINING SYSTEM WITH COLLAPSIBLE RACKS

[75] Inventor: Joseph J. Thuli, Darlington, Wis.

[73] Assignee: Darlington Dairy Supply Co., Inc., Darlington, Wis.

[21] Appl. No.: 816,887

[22] Filed: Dec. 31, 1991

[51] Int. Cl.[5] ............... A01J 25/00; A23C 19/00
[52] U.S. Cl. .................................. 99/452; 99/535; 118/425; 134/135; 211/118
[58] Field of Search .................. 99/452–456, 99/460, 534, 535, 516, 517; 426/361, 582, 36, 512; 134/135; 108/149; 62/394; 118/423, 425; 211/195, 118, 201

[56] References Cited

U.S. PATENT DOCUMENTS

| | | | |
|---|---|---|---|
| 378,670 | 2/1888 | Fletcher | 134/135 |
| 620,627 | 3/1899 | Willner | 118/425 |
| 2,493,754 | 1/1950 | Dorfan | 118/425 |
| 2,657,810 | 11/1953 | Garrick | 211/90 |
| 3,262,420 | 7/1966 | Bossi et al. | 118/425 |
| 3,910,174 | 10/1975 | Nelles | 99/452 |
| 4,068,014 | 1/1978 | Heimbruch | 426/582 |
| 4,244,301 | 1/1981 | Nakatsu | 108/149 |
| 4,331,230 | 5/1982 | Buckley | 134/135 |
| 4,523,526 | 6/1985 | O'Neill | 108/149 |
| 4,566,377 | 1/1986 | van Buytene | 99/474 |
| 4,749,090 | 6/1988 | Darmanin | 211/118 |
| 4,815,368 | 3/1989 | Nelles | 99/452 |
| 4,817,650 | 4/1989 | Tilton | 134/135 |
| 4,869,161 | 9/1989 | La Count | 99/452 |
| 4,917,250 | 4/1990 | Barbieri et al. | 211/195 |
| 5,018,440 | 5/1991 | Johnson | 99/535 |

FOREIGN PATENT DOCUMENTS 1380691 3/1988 U.S.S.R. .
2032759 5/1980 United Kingdom ............. 99/535

OTHER PUBLICATIONS

One of the most rationalized cheese factories in Holland, Nordisk-mejeri-tidsskrift, vol. 36(i), 1970, pp. 30–35.
The new MC-dairy at Götene, Sweden, reprint from Nordeuropaeisk mejeri-tidsskrift, NR. 8, 1972, pp. 1–15.
The dairy industry of south Holland will also be counted Nordeuropaeisk mejeri-tidsskrift, vol. 41, No. 8, 1975.
Alfa-Laval catalog page, date unknown.

Primary Examiner—Timothy F. Simone
Attorney, Agent, or Firm—Lathrop & Clark

[57] ABSTRACT

A cheese brining rack is composed of a number of shelves, the shelves having perforation therein for the free flow of brine through the shelves and about blocks of cheese which are held by bouyant forces against the undersides of the shelves. The shelves, which preferably will be made of stainless steel are joined together along by collapsible linkages. Collapsible linkages may be formed by tubular support brackets with support chains passing therethrough and being joined to the tubular brackets by transverse pins. The collapsible brine racks are employed with an overhead hoist assembly. A hoist assembly positions the shelves with respect to the surface of brine in a brine tank. The shelves have a downwardly extending lip on one end which serves to retain blocks of cheese which are moved by a current brine into the space between the shelves. When blocks of cheese are unloaded from the shelves, the lip is positioned relative to the brine surface such that the blocks may freely float under the lip. Thereby, allowing the brine current to unload the cheese brining racks.

11 Claims, 5 Drawing Sheets

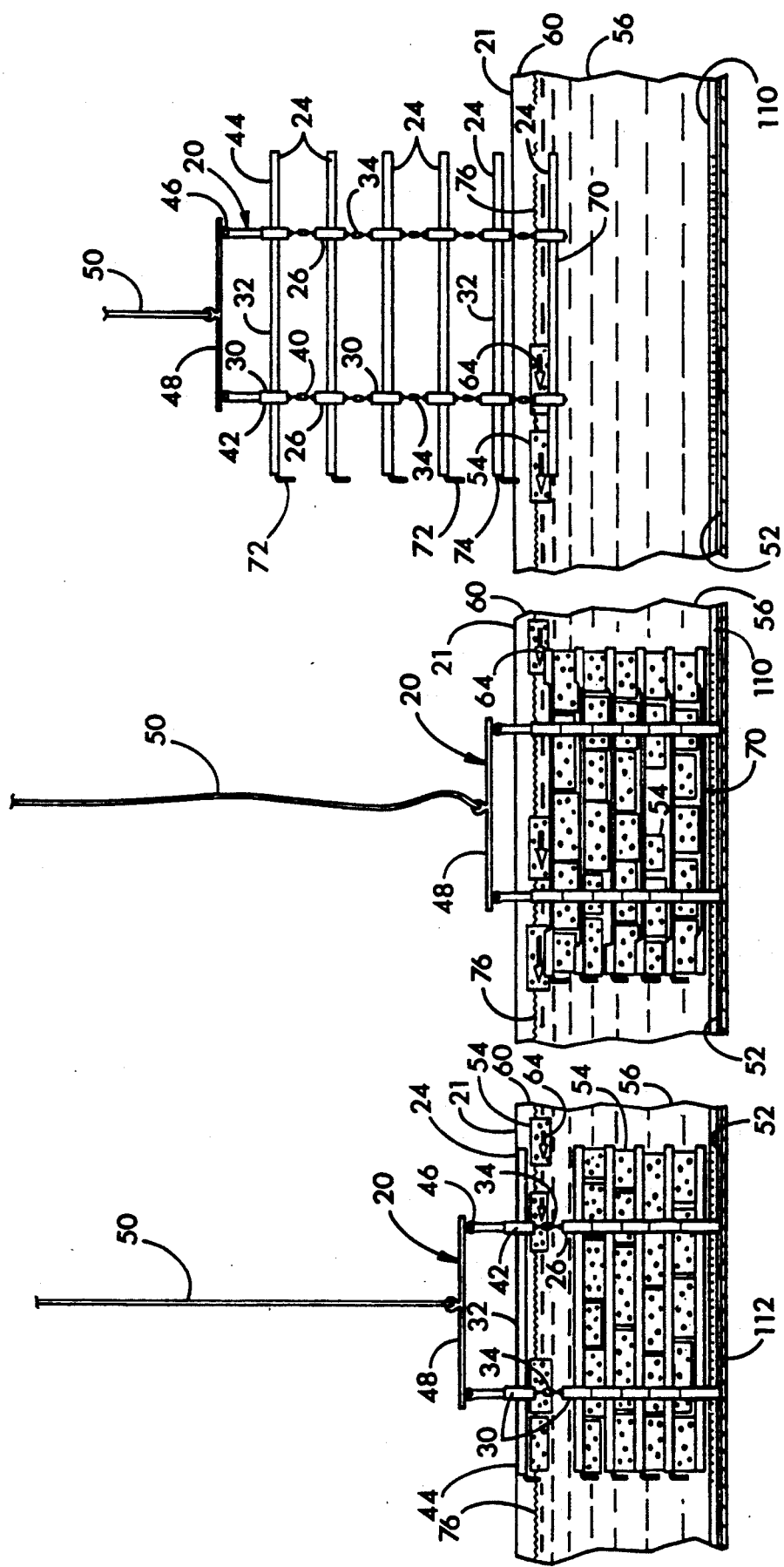

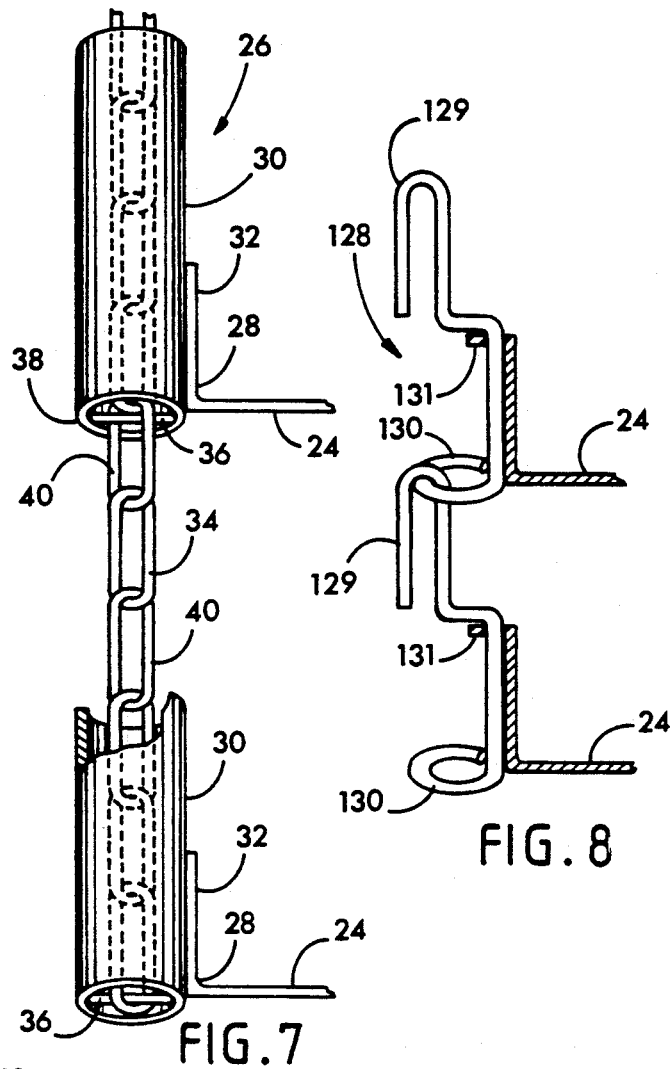
FIG. 7
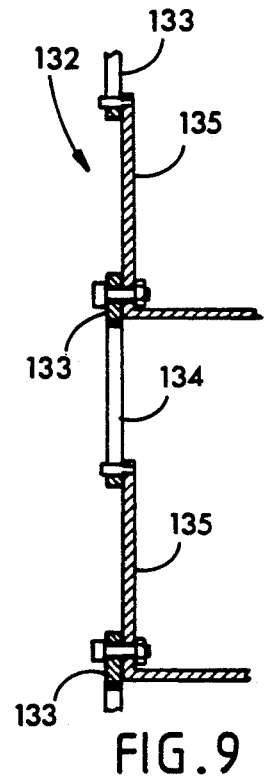
FIG. 8
FIG. 9
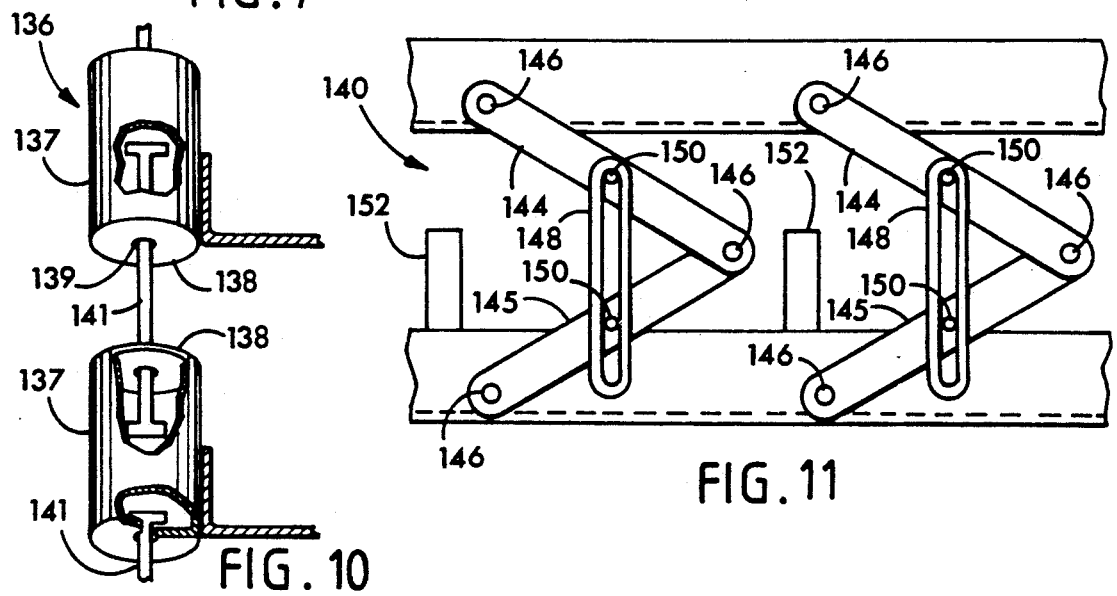
FIG. 10
FIG. 11

CHEESE BRINING SYSTEM WITH COLLAPSIBLE RACKS

FIELD OF THE INVENTION

This invention relates to cheese brining in general and racks for holding cheese in a brining pit in particular.

BACKGROUND OF THE INVENTION

In the manufacture of cheese, milk is processed in batches to form curd which is separated from the remaining liquid or whey and compressed into blocks or sometimes cylindrical shapes. The blocks are placed in a salt bath or brining solution which cools and salts the cheese. Depending upon the amount of time the cheese blocks spend in the brine solution and the type of cheese being produced, the brine bath may form a characteristic rind on the exterior of the cheese block. After a period of time which may range from hours to days depending on the type of cheese, the cheese is removed from the brining solution, dried, and cured or otherwise processed before shipment to the consumer.

Because brining of cheese often will require the cheese to soak in a tank of brine for several days, a substantial portion of the floor space of a cheese factory can be taken up by the brine tanks required to hold several days, cheese production. Cheese will float in a typical brine solution which is 70-80 percent saturated with salt. Until recently, cheese was brined in large shallow open tanks built into the factory floor. These shallow tanks would contain a single layer of floating cheese blocks which would be turned from time to time or be sprayed with a salt solution to ensure that all surfaces of the cheese blocks were exposed to the brining solution. An improvement on the shallow tank cheese brining system utilizes relatively deep cheese brining tanks or pits in combination with multi-shelved racks on which the cheese blocks are loaded. When fully loaded each rack is lowered into the brining tank for brining by means of an overhead crane.

This system of cheese brining was further improved to include the float loading of the cheese blocks onto the racks. The cheese blocks are floated in a stream of moving brine which transports the cheese blocks into the individual shelves of the rack as it is progressively submerged in the brining tank.

These developments in cheese brining systems have reduced the floor space required to be devoted to cheese brining tanks in a cheese factory. However, cheese brining tanks still occupy a considerable area in the typical cheese factory in part because the brining tanks are not efficiently filled with cheese in that the shelves of the racks must be spaced a considerable distance apart to allow the easy float loading and unloading of the cheese.

The open brine tank also is a source of maintenance problems in that fine salt particles are emitted by the open brine tanks. These salt particles cause salt corrosion of nearby equipment. Therefore, by keeping the surface area of the tanks small and by placing critical equipment a distance from the tanks, this problem is minimized. In existing dairies where upgrades in the cheese making equipment have increased the rate of production, it has hithertofor not been possible to increase the cheese brining capability without a greater cheese brining tank area or a deeper cheese brining tank requiring major facility modifications of the cheese factory.

What is needed is an apparatus for more densely loading cheese into a brining pit.

SUMMARY OF THE INVENTION

The cheese brining system of this invention employs a collapsible cheese brining rack. The rack is composed of a number of shelves, the shelves having perforations therein for the free flow of brine through the shelves and about the cheese blocks which float up against the underside of the shelves. The shelves, which preferentially will be made of stainless steel, are joined together along their outside edges by four chains, the chains being mounted to the edges of the shelves within tubular spacers. The collapsible shelves are employed with an overhead hoist assembly which suspends the uppermost shelf from a lifting bracket. Each successive shelf below the first shelf is suspended in a fixed parallel array by means of the four chains, two on each side of the shelves forming a rectangular array. The chains pass through tubular brackets and they are fixed to the brackets by transverse pins, the brackets being in turn attached to the sides of the shelves. The shelves are rectangular in shape with the supporting chains disposed along the long sides. The rack shelves have an upstream side disposed in the direction from which cheeses are loaded and a downstream side at the side where cheeses are unloaded. The downstream side of each shelf has a down turned lip which depends downwardly. The collapsible cheese brining racks are employed with a deep brine tank which has a circulation system for circulating brine and a motive system for moving the floating cheese blocks through the brining tank. The tank will typically employ three or more collapsible brining racks aligned end to end. In operation, cheese is supplied to the brining tank by means of a ramp, the cheese blocks float into the space between the lowermost shelf and the next lower shelf of the suspended rack. When the cheese block reaches the downstream end of the shelf, it is retained by the downwardly depending lip. The cheese rack is held at a fixed height until the entire shelf is loaded with cheese blocks. It is then lowered until the next shelf is in position to receive floating blocks of cheese and so on until all the shelves of the cheese rack are loaded. As successive shelves of the collapsible rack are loaded, the bottom shelf comes to rest upon the bottom of the brine pit, and now, rather than being supported by the suspension chains, rests on its tubular supports. As successive shelves are loaded and the brine rack lowered deeper into the brining tank, each successive shelf collapses until its tubular supports are in contact with the tubular supports of the lower shelf. The support chains are then contained within the tubular supports, collapsing the shelf to approximately half its suspended height. When a collapsible brine rack is completely loaded and has been lowered into the brine tank, the uppermost shelf of the rack is submerged beneath the brine surface and allows blocks of cheese to float over the rack. The floating cheese may then be loaded into a second rack disposed further downstream of the first rack. To unload the cheese brining racks, the process of loading is reversed, only the shelf immediately above the cheeses to be unloaded is hoisted above the surface of the brine so that the cheeses may float under the lip which depends from the downstream end of the shelf. In this way, the positioning of the rack within the cheese brine controls whether the cheese is retained by the rack or is allowed to float through the rack.

Because the precise location of the shelves of the brine racks with respect to the surface of the brining liquid is critical, the brining system disclosed herein will normally employ an automatic control system involving sensors and feedback to automatically position the shelves for proper loading and unloading of cheeses.

It is an object of the present invention to provide a cheese brining system which requires less factory floor space for a given cheese brining capability.

It is a further object of the present invention to provide a cheese brining rack which is capable of collapsing and so more efficiently filling the volume of a brining pit.

It is another object of the present invention to provide a cheese brining system including a plurality of racks disposed in a flow channel wherein cheese may be float loaded into downstream racks by floating over the top of upstream racks.

It is yet another object of the present invention to provide a cheese brining rack with shelves which are widely spaced for loading and unloading of cheeses, yet which are narrowly spaced when the cheese supported therein is submerged in brine.

It is also an object of the present invention to provide a cheese brining system employing cheese brining racks which are positioned by an automatic control system providing automatic float loading and unloading of cheese.

It is a still further object of the present invention to provide a cheese brining rack which can be retrofitted into existing cheese brining tanks to increase their cheese brining capacities.

Further objects, features and advantages of the present invention will be apparent from the following detailed description when taken in conjunction with the accompanying drawings.

BRIEF DESCRIPTION OF THE DRAWINGS

FIG. 3 is a side elevational view of the cheese brining rack of this invention shown in the process of float loading cheese blocks.

FIG. 4 is a side elevational view of the cheese brining rack of this invention shown loaded with cheese blocks and collapsed within a brining tank so that cheese blocks may float by above the brining rack.

FIG. 5 is a side elevational view of the cheese brining rack of FIG. 1.

FIG. 7 is a detailed view of the collapsing mechanism of the rack of FIG. 1.

FIG. 8 is a side elevational fragmentary view of an alternative embodiment of the collapsing mechanism for a cheese brining system of this invention.

FIG. 9 is a side elevational fragmentary view of another alternative embodiment of the collapsing mechanism for a cheese brining system of this invention.

FIG. 10 is a side elevational fragmentary view of yet another alternative embodiment of the collapsing mechanism for a cheese brining system of this invention.

FIG. 11 is a fragmentary front elevational view of still another alternative embodiment of the collapsing mechanism for a cheese brining system of this invention.

DESCRIPTION OF THE PREFERRED EMBODIMENT

Figure 1:
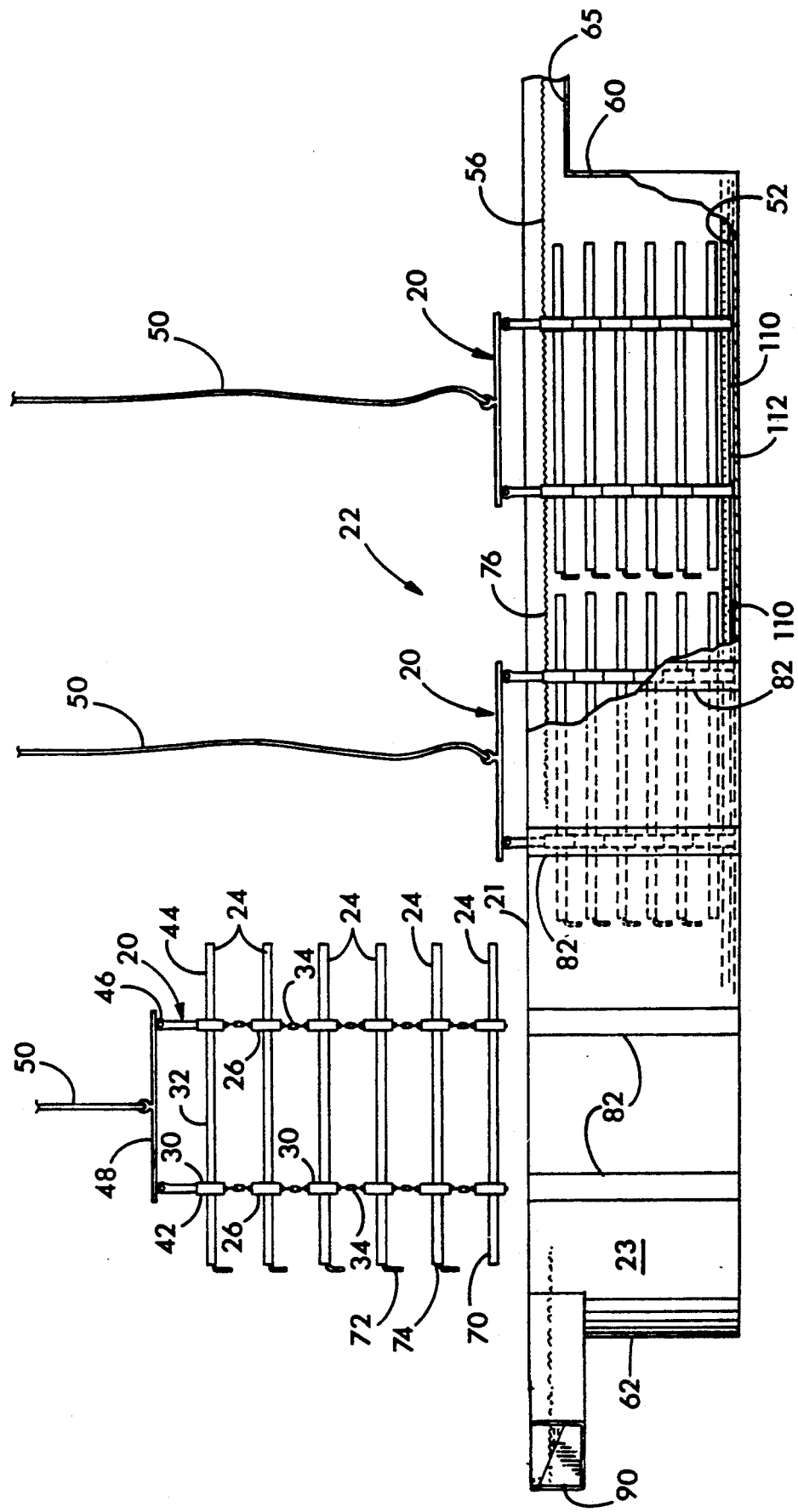
FIG. 1 is a front elevational view of a cheese brining system employing a collapsible rack of this invention with the brining tank shown partly cut away.
Figure 2:
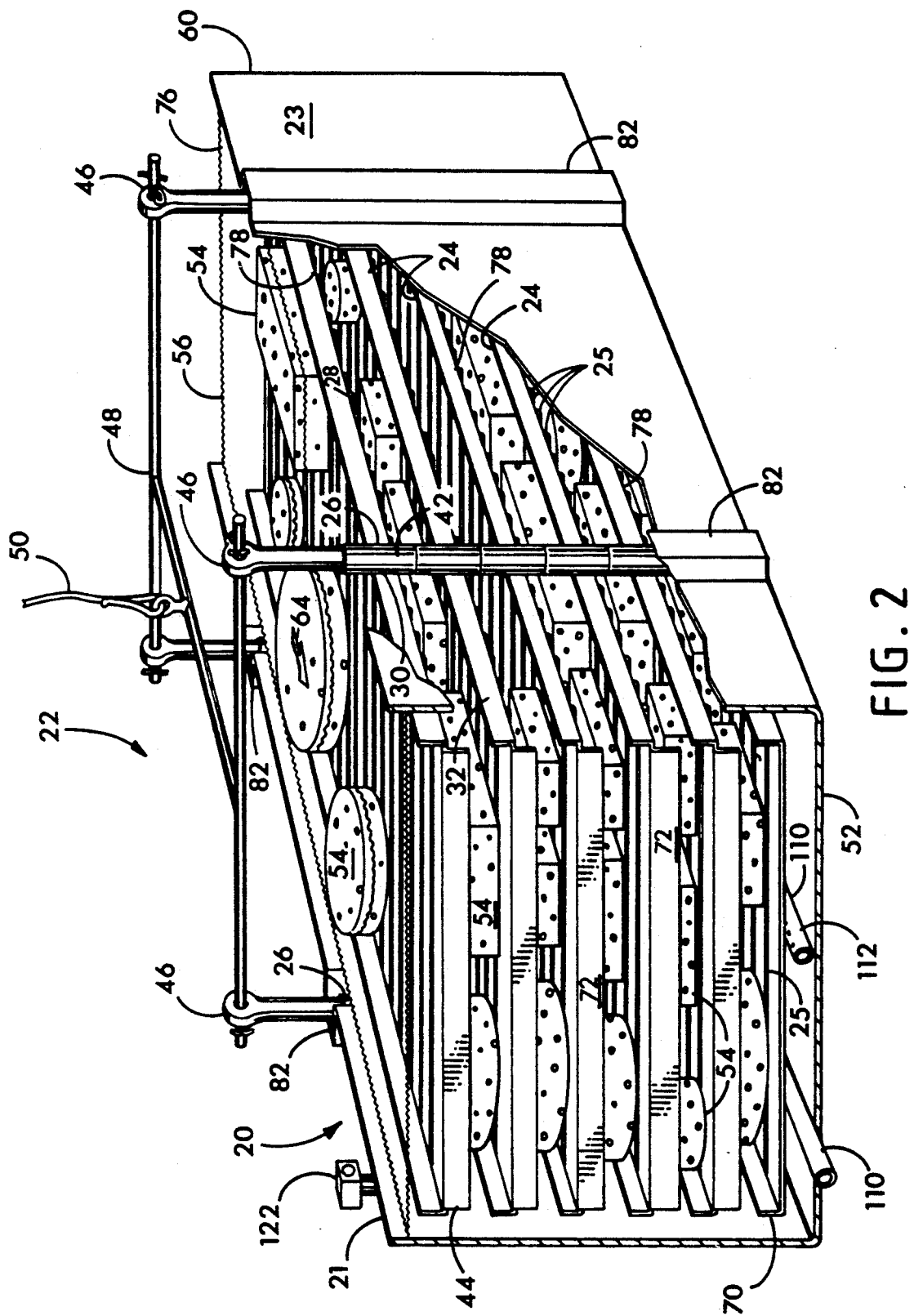
FIG. 2 is an isometric view partly cut away of the cheese brining system of FIG. 1 with a brining rack shown collapsed and loaded with cheeses in a brine tank.

Referring more particularly to FIGS. 1-11 wherein like numbers refer to similar parts, a collapsible cheese brining rack 20 is shown in FIGS. 1-5. The collapsible cheese brining rack 20 is used in combination with the brine tank 21 shown in FIG. 1 which is part of an overall cheese brining system 22 best shown in FIG. 6. The brine tank 21 is preferably fabricated of stainless steel and has vertically extending sidewalls 23. The tank is adapted for the flow of a stream of brine therethrough.

The cheese brining rack 20 has a plurality of shelves 24, for example six as shown in the drawings. Each shelf 24 is formed from a screen or sheet of perforated metal, selected for its resistance to corrosion. The perforations allow water to flow easily through the shelves allowing the shelves to be lowered and raised from a water both of minimal resistance. Transverse ribs 25 are formed in the shelves 24 running between the upturned lips 32 to stiffen the perforated metal sheets. As the shelves in a common brining system 22 can be 5-6 feet wide, these ribs prevent undue drooping of the shelves 24. The shelves 24 are joined together one to the other by collapsible linkages 26 best shown in FIG. 7. Four sets of collapsible linkages 26, two on each side 28 of each shelf 24, serve to link the shelves 24 together to form a parallel array of shelves 24 which makes up the brine rack 20.

Each collapsible linkage 26 has a tubular bracket 30 which is welded to one of the upturned lips 32 which form the sides of the shelves 24. A support chain 34 passes through each tubular bracket 30 and is joined to the tubular bracket by means of a transverse pin 36 which spans the diameter 38 of the tubular bracket 30 at the lowermost end. The chain 34 is composed of links 40 which form the collapse mechanism of the collapsible linkage 26. Thus each of the four chains 34 is pinned to all of the six shelves 24. The chains are sufficiently strong to lift the combined weight of the shelves 24, although, because of the bouyant nature of the cheese, the chains are never required to support any cheese loads. The uppermost tubular brackets 42 on the uppermost shelf 44 have hoist loops 46. The hoist loops 46 are joined to a hoist fixture 48 which in turn is attached to an overhead cable 50 which is used to raise and lower the collapsible brine rack 20.

The collapsible rack 20 has two extreme positions and may be selectively positioned as desired between those extremes. The first extreme, best shown in FIG. 5, is when the brine rack 20 is suspended from the hoist fixture 48 and each of the shelves 24 is suspended from the support chains 34 which are attached to the tubular brackets 38 by means of the transverse pins 36. The second extreme position of the rack 20, best shown in FIG. 4, is a collapsed state in which the tubular brackets 38 are stacked upon and supported one upon the other and in which the collapsed links 40 of the support chains 34 are contained within the tubular brackets 30. As shown in FIG. 4, when the brining rack 20 is in its collapsed state, the shelves 24 rest upon the bottom 52 of the brine tank 21. Between the extreme positions, the rack 20 may be located at a number of intermediate positions corresponding to a loading position and an unloading position for each shelf.

By selecting the number of links 40 of each chain 34 which extend between the tubular support brackets 30 attached to the sides 28 of the shelves 24 or by increasing or decreasing the height of the tubular brackets 30 a system having a particular desired ratio between the collapsed height of the rack 20 and the uncollapsed height of the rack 20 may be selected. The desired ratio between the collapsed height and uncollapsed heights of the rack 20 will depend upon the thicknesses of the cheese blocks 54 with which the rack 20 is used. For example, for some types of cheeses where the blocks are eight to ten inches thick, it will be desirable to have the tubular brackets 30 a foot long with a number of chain links 40 between tubular brackets 30 chosen so that the shelves 24 are two feet apart when they are suspended from the hoist fixture 48. The shelves when collapsed and resting on the bottom 52 of the brine tank 21 will then be approximately one foot apart.

FIGS. 3-5 illustrate how the collapsible cheese brining rack 20 is used. It is employed as part of a cheese brining system, best shown in FIG. 6, which has a brine tank 21. The depth of the brine tank 21 is chosen so that when the brine rack 20 is resting on the bottom 52 the brine level completely covers the rack 20 so that cheese blocks 54 may be floated over the uppermost shelf 44. The brine 56 employed in the brining system 22 will normally be seventy to eighty percent saturated in salt. A brine solution of such density will float the cheeses so they may be moved along the surface of the brine by a motive system 58 which consists of a current of brine 56 which flows from the inlet end 60 to the outlet or discharge end 62 of the brine tank 21. Arrows 64 in FIGS. 3-5 indicate the direction of motion of the cheese blocks 54 which are moving in the brine current.

Figure 6:
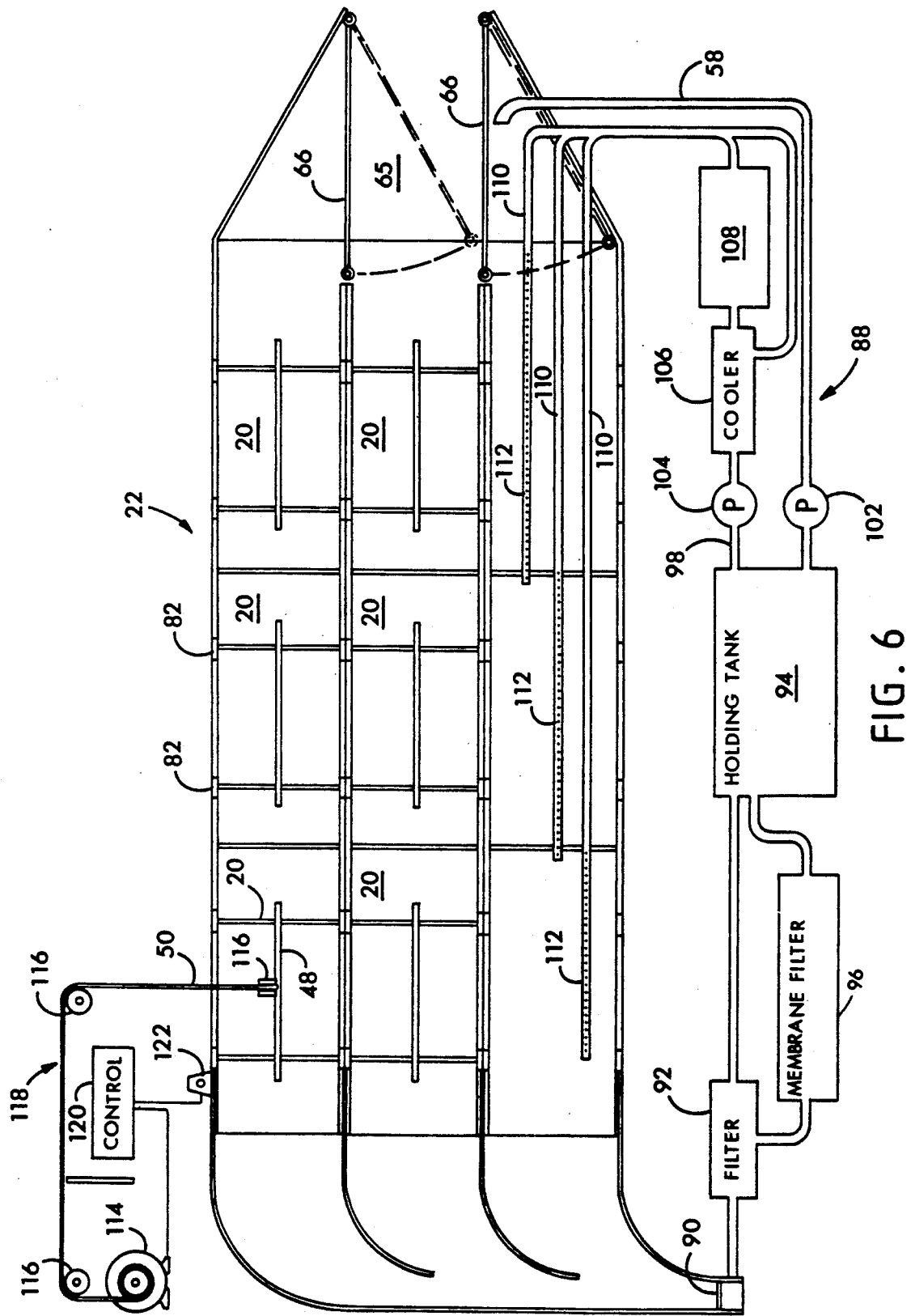
FIG. 6 is a schematic plan view of the cheese brining system of this invention employing collapsed racks.

As shown in FIG. 6, cheese blocks 54 are conveyed by a conveyor or a ramp (not shown) and are delivered to a shallow portion 65 of the tank adjacent the inlet end 60 of the tank 21, where they enter a recirculating stream of brine 56. The cheeses 54 are directed such as by means of gates 66 to one of a number of parallel brine tanks 21 where jets of brine disposed at the upstream end of the tanks 21 form the motivation system 58 which produces a surface current of brine which progresses the cheese blocks 54 down the length of the brine tanks 21. The cheese blocks 54 are loaded into the brining racks 20 starting with the lowest shelf 70.

Because the cheese blocks 54 are bouyantly supported by the brine in which they float, the cheese blocks 54 do not rest on the shelves, rather they are restrained by the underside of the adjacent shelf 24 from their bouyant tendency due to their bouyancy to rise to the surface of the brine tank. The racks, being formed of metal, are sufficiently dense and heavy to sink to the bottom of the tank, even when the bouyant loads of multiple cheeses are disposed against them.

Each shelf 24 of the brine rack 20 has a downwardly depending flange 72 on the downstream end 74 of the shelf 24. The downwardly depending flanges 72 located at each shelf 24 are successively positioned with respect to the brine solution surface 76 so as to prevent the cheese blocks 54 from floating past beneath the shelf 24. The rack 20 is held in a fixed position with a shelf 24 supported above the surface of the brine, with the depending lip extending into the path of the oncoming cheeses, until sufficient cheese blocks 54 have been caught on the underside 78 of a shelf 24 to substantially fill the area defined by the shelf 24. As illustrated in FIG. 3, the rack 20 is successively lowered into the brine 56, each shelf having sufficient weight (or more accurately, negative bouyancy) to sink the cheeses trapped thereunder. The rack 20 is lowered until the next most shelf 24 is in position with its flange 72 blocking the flow path of cheese blocks 54. This process is continued until, as shown in FIG. 4, all the shelves 24 of the rack 20 are loaded with cheese blocks 54. Because the cheese blocks 54 are bouyant, they float up against the underside 78 of the shelves and are positively restrained on the shelves 24 undersides 78 by the bouyant force of the brine 56. The ribs 25, which are formed in the shelves and which protrude downwardly, engage with the cheeses and leave open channels for the flow of brine over the top surfaces of the cheeses. The cheese blocks 54 are left submerged in the brine 56 for a time which may be measured in days as required for a particular variety of cheese. Typically, more than one rack will be disposed within a brining tank for the brining of cheese blocks. As shown in FIG. 4, once a rack has been completely loaded with cheese blocks, it is submerged sufficiently within the brine that additional cheese blocks are free to float over the uppermost shelf in the rack and beneath the hoist fixture 48. In this way the loaded rack may continue submerged and undisturbed while racks further downstream are loaded. Likewise, upstream racks may be unloaded and their cheeses released and floated over the surface of the submerged racks without disturbing the submerged cheese blocks. It should be noted that within the same brining tank it will thus be possible to retain cheeses under brining conditions for different periods of time.

The cheese blocks 54 are unloaded after brining is complete by hoisting the collapsible rack 20 in progressive steps out of the brine tank 21. This is not a reversal of the loading process in that as each successive shelf 24 is hoisted from the brine 56 the shelf 24 with its downturned flange 72 is positioned with respect to the brine surface 76 so that the cheese blocks 54 may freely float out under the downturned flange 72. With the shelf thus elevated, the cheese blocks 54 are released into the brine current created by the motive current where they progress to the downstream discharge end 62 of the brine system 22. The cheese blocks 54 are removed from the discharge end 62 of the brine system 22 by means of an elevating conveyor or the like (not shown).

In known deep tank brining systems employing float loading of cheese blocks, the cheese blocks are prevented from flowing past the shelves of the brining racks by a gate disposed across the downstream end of the rack. Thus, because the conventional brining racks do not have the downturned flange on the downstream ends of the shelves only a single brine rack can be placed in each brining tank. Therefore, the typical brining rack used in known deep tank brining systems will be considerably larger than the brining racks 20 perhaps two to four times as large in a typical installation. This means that a conventional cheese brining system cannot efficiently deal with multiple small batches of different types of cheese.

The use of the flange on the downstream sides of the shelves is only practical in a collapsible rack 20 where the lip does not require a greater spacing between the shelves because the collapsible links 26 allow the shelves 24 to be spaced far apart for loading and unloading shown in FIG. 3 and 5 but allow the shelves to be closely spaced while the cheese is being held for brining within the brine tank 21 allowing a much more economical brining tank of reduced depth. The collapsible brining rack 20 also allows approximately one-third more cheese to be held in a given volume of brine tank 68 as compared to a conventional fixed rack system.

The brine rack 20 can be retrofit into an existing brining system by replacing the large monolithic brining racks with a number of smaller collapsible racks 20 so economically upgrading a conventional brining system to handle a greater volume of cheese blocks 54 and to further provide a cheese brining system 22 which can individually process smaller batches of cheese.

FIG. 1 shows a brine tank 21 holding three collapsible brine racks 20. The brine tank 21 has side wall channels 82 which hold and guide the tubular brackets or engaging members 38 so as to assure their proper alignment as the brine rack 24 is lowered into the brine tank 21. As shown in FIG. 1, the inlet end 60 of the brine tank 21 need only have sufficient depth to float the cheese blocks 54. Likewise the discharge end 62 is also shallow.

The brine tank 21 of FIG. 1 will normally form part of a brining system 22 employing a number of brine tanks 21 which are positioned in a parallel relation and scaled to match the cheese production capability of a particular cheese factory. By way of example, the cheese brining system 22 has three brine tanks 21 each containing three brine racks for a total of nine racks each having six shelves which would allow fifty-four separate batches or units of cheese to be submerged in brine at the same time. The brining system 22 includes the brine tanks 21 which are connected to a brine conditioning system 88. The brine conditioning system 88 is connected to the discharge end 62 of the brine tanks 21 by means of a weir 90. The weir 90 serves to maintain the level of the brine in the tanks 21 at a constant height as cheese is loaded or unloaded from the brine tanks 21 and so displace more or less brine 56. From the weir 90 the brine flows to a mechanical filter 92. The filter 92 may be used in combination with a screen (not shown) to remove the larger chunks of cheese and debris. The mechanical filter 92 removes particulants and fats which have become entrained in the brine. From the filter 92 the majority of the brine flows directly to a holding tank 94. A portion of the brine, after mechanical filtering, may pass through a membrane filter 96 which is capable of removing protein or other organic matter from the brine solution. The membrane filter 96 can be an important part of the overall brine system 22 with the increasing emphasis on minimizing pollution by designing zero discharge industrial processes. The membrane filter 96 by removing the build-up of organic materials in the circulating brine solution can minimize or eliminate the necessity of disposing of any of the brine solution.

The holding tank 94 will preferably be sized such that it can hold all of the brine solution contained in the brine tanks 21 so that when it is necessary to drain the brine tanks for cleaning or inspection all the brine may be pumped to the holding tank through a drain (not shown). From the holding tank 94 the brine is pumped along one or both of two circuits: a brine conditioning circuit 98 and a brine motive system 58.

The brine motive system 58 employs a pump 102 with relatively high capacity which pumps brine to the motive system 58 disposed at the upstream end 84 of the brine tanks 86. For clarity the brine motivating circuit and the brine conditioning circuit have only been shown in one of the three brine tanks 21 shown in FIG. 6 but would be in practice connected to all the tanks 21 of the brining system 22. The brine motivating circuit 58 causes a current to flow from the inlet end 60 to the discharge end 62 of the brine tank 68 thereby moving blocks of cheese into and out of the brine racks 20. Therefore, the brine motive circuit need only be on when cheese is being loaded or unloaded. The brine conditioning circuit 98 on the other hand has a lower capacity pump 104 which moves a stream of brine through a plate cooler 106 which chills the brine so as to maintain the brine 56 in the tank 21 at the proper temperature for cooling and brining the cheese—normally in the range of 50° to 65° Fahrenheit. Normally a portion of the cooled brine will be sent through a brine maker to replace the salt which is absorbed by the cheese blocks 54 from the brine bath.

The brine maker 108 will normally be comprised of a tank containing salt pallets through which a portion of the brine is caused to flow, the brine entering the brine maker 108 at seventy to eighty percent saturated and leaving at nearly one hundred percent saturated. The amount of brine flowed through the brine maker is controlled by a valve in conjunction with a salinity meter (not shown) to maintain the overall salinity of the brine 56 at a chosen level.

The conditioned brine is injected along the bottom 52 of the brine tanks 21 through a series of injection pipes 110. The pipes 110 extend progressively further down the brine tanks 21 and have perforations along progressive sections 112 of their extended lengths so that all along the tanks 21 conditioned brine is introduced to the tank. Thus a separate pipe 110 supplies brine beneath each rack 20. Thus all the cheese blocks 54 are exposed to brine 56 of uniform temperature and salinity.

Because equipment which is adjacent to or located over the brine tanks is subject to corrosion, the collapsible brine racks 20 will normally be hoisted by a hoist fixture 48 which is attached to a cable 50 which communicates with a hoist motor 114 by a series of pulleys 116 so that the hoist motor 114 may be placed in another room remote from the corrosive atmosphere associated with the brining tanks. The hoist system 118 will normally employ a control system 120 in conjunction with a number of sensors 122 such as electric eyes which provide feedback on the position of the shelves such as a low carbon 304 or 316 stainless steel or titanium.

Through means of the controller and the sensor 122 the motion of the racks 20 may be programmed to automatically load and discharge cheese from the racks 20, by automatically positioning each shelf 24 in the proper position for loading or unloading of cheese blocks 54.

Because the brine is a corrosive environment, the collapsible racks 20 including the shelves 24, tubular brackets 30 support chains 34, a hoist fixture 48 and the cable 50 should all be constructed of a material resistant to corrosion such as low carbon 304, 316 stainless steel or titanium.

The collapsible link 26 best seen in FIG. 7 employs a tubular bracket 30 which is attached to the upturned lip 32 of the shelves 24, and has support chains 34 joined to the tubular brackets 30 by means of transverse pins 36.

It should be understood however that the invention is not limited to a particular type of collapsible linkage. Rather, the invention encompasses any mechanism for rendering the shelves collapsible. FIGS. 8–11 show collapsible linkages 128, 132, 136, 140 which are examples of the various types of mechanical linkages that might be employed.

A collapsible linkage 128 employing interlocked hooks 129 and eyes 130. The shelves 24 are held apart in the collapsed state by extended shelf lifts 131.

The collapsible linkage shown in FIG. 9 shows a plate 133 and slot 134 arrangement which hold the shelves 24 spaced apart. The upturned lip 135 supports the shelves 24 spaced apart when in the collapsed condition.

Collapsible linkage 136 shown in FIG. 10 employs tubular brackets 137 with end caps 138 having central holes 139 with I linkages 141 providing the collapsible linkage between the tubular brackets 137.

The collapsible linkage 140 shown in FIG. 11 employs articulated linkages consisting of an upper link 144 and a lower link 145 which are joined to each other and the shelf lip 32 by pins 146. The articulated linkage 142 is prevented from fully opening by limiter 148 which is held by means of pins 150 in engagement with the articulated linkage 142.

In the collapsed position, the shelves 24 may be held apart by stops 152 which support the shelves 24 spaced apart in the collapsed condition.

All the collapsible shelves 20 may be retrofit into existing brine tanks. In new installations it will be desirable to fabricate tanks especially adapted for use with the collapsible shelves 20. A brine tank 21 may be fabricated of stainless steel. Such a brine tank 21 would be typically 35 feet long and 65 inches across and employ three brining racks 20 with 6 shelves each. A brine tank 21 fabricated of stainless steel could be rendered portable which might be advantageous in allowing the fabrication of the brine tank 21 in a stainless steel fabrication shop after which it could be shipped to the factory site. Alternatively, the tanks could be fabricated of concrete cast in place in the floor of the cheese factory.

The cheese brining system 22 best shown in FIG. 6 lends itself to complete automation. The racks 20 will normally be under the control of a controller 120 which will properly position the rack 20 for the loading and unloading of cheese. Further steps of automation could be employed which would count the number of blocks of cheese 54 as they enter the inlet end 60 of the brining system 22. The control system 120 could also control the position of the gates 66 thereby directing a number of blocks of cheese 54 to a particular tank 21. The controller may then determine into which rack 20 and which shelf 24 the cheese blocks 54 are loaded.

The controller may also be used in combination with input perimeters defining the type of cheese being supplied to the system 22. With appropriate programming setting the required brining time for each batch and variety of cheese 54, the controller may hold the cheese within the racks 20 such that each batch of cheese is brined for a preset period and then automatically unloaded by the unloading mechanism for each brine rack 20.

It should be noted that where the use of a controller is suggested, the cheese brining system 22 could be manually controlled.

It is important to note that the number of shelves and the ratio between their collapsed and uncollapsed height may be adjusted to conform to the depth of the cheese brining tank and the size of the individual cheese blocks.

It should further be noted that the size of the collapsible racks 20 and the shelves 24 may be varied as necessary to conform to the size of the batches of cheese produced by the a particular process.

It should further be noted that the collapsible tubular brackets 30, 137 may have openings in the walls thereof to facilitate the cleaning of the linkages 26, 136.

It is understood that the invention is not confined to the particular construction and arrangement of parts herein illustrated and described but embraces such modified forms thereof which come within the scope of the following claims.

I claim:

1. A system for brining cheese comprising:
   a) a tank having a length and being filled with a brine solution and adapted to receive a stream of flowing brine along the length of the tank; and
   b) at least one rack having a plurality of planar perforated shelves vertically spaced from one another, the rack being movable vertically to alternatively submerge the shelves within or to elevate the shelves above the brine solution, and wherein the shelves are collapsibly connected to one another, such that when the rack is suspended with less than all of the shelves submerged within the brine solution, an unsubmerged shelf is spaced above the uppermost submerged shelf in a loading spacing which is a sufficient distance to admit the unobstructed float loading of bouyant cheese beneath the unsubmerged shelf, and when the rack is entirely submerged within the brine solution the shelves collapse toward one another and are disposed at a spacing narrower than the loading spacing.

2. The brining system of claim 1 further comprising a downwardly depending lip which extends from a downstream edge of each shelf, the lip being adapted to engage against and restrain the downstream motion of a float-loaded bouyant cheese.

3. The brining system of claim 1 further comprising a cable hoist connected to the rack to support the rack, the hoist being connected to the rack at a position spaced above the shelves such that a clearance for the passage of bouyant cheeses is defined between the hoist and the topmost shelf.

4. The apparatus of claim 1 further comprising a plurality of transverse ribs formed by portions of the rack shelves, the ribs serving to stiffen the shelves.

5. The apparatus of claim 1 wherein the tank has vertical side walls, the side walls having portions forming vertical channels, and wherein the shelves have engaging members rigidly attached thereto, the engaging members being adapted to engage with the vertical channels to align the rack and guide the rack in a vertical movement as the rack is elevated and lowered.

6. The apparatus of claim 1 further comprising a sensor mounted adjacent to the tank to detect the position of the shelves and a controller to control the position of the shelves to automatically load cheeses moving in a stream of brine through the tank onto a selected shelf of a rack.

7. The system of claim 1, wherein the rack comprises:
   a) a plurality of perforated shelves, each shelf having a downwardly depending lip located on a downstream shelf edge, the lip being adapted to engage against and restrain the downstream motion of a bouyant cheese;
   b) a plurality of tubular members connected to each shelf; and c) a plurality of vertically extending chains connected to the tubular members, wherein each chain connects a tubular member from each shelf to align the shelves in a vertical array, and wherein the chains are collapsible such that the tubular members of the arrayed shelves may engage with one another and support the shelves in a vertical stacked array within the brine tank.

8. The system of claim 1 wherein the rack comprises a plurality of perforated shelves, and a plurality of engaged links are connected between the plurality of shelves, such that when the engaged links are loaded in tension, the shelves are spaced a first distance apart to receive float-loaded cheeses, and when the engaged links are loaded in compression, the shelves are spaced a second distance apart to store the loaded cheeses submerged within the brine tank, wherein the second distance is less than the first distance.

9. A system for brining cheese comprising:
a) a brining tank;
b) one or more racks movable into and out of said brining tank, the racks further comprising a plurality of shelves joined by a means for collapsing, the means for collapsing also being a means for suspending the shelves in parallel spaced array, the means for collapsing are collapsible to allow the shelves to form a more closely stacked parallel array of said shelves.

10. The brining system of claim 9 wherein the tank forms a brine flow channel and wherein the racks are disposed within said flow channel.

11. The cheese brining system of claim 10 wherein the shelves have side edges, the side edges having portions forming upwardly extending side flanges, the shelves having inlet ends facing the direction of brine flow and outlet ends opposed to the inlet ends, the outlet ends having downwardly depending flanges, wherein the downwardly depending flanges and the raised sides are adapted to contain cheese which is floated into a space formed between adjacent shelves.

* * * * *